Nov. 3, 1959  A. A. JONKE ET AL  2,911,290
MULTISTAGE FLUIDIZED BED REACTOR
Filed April 18, 1957  2 Sheets-Sheet 1
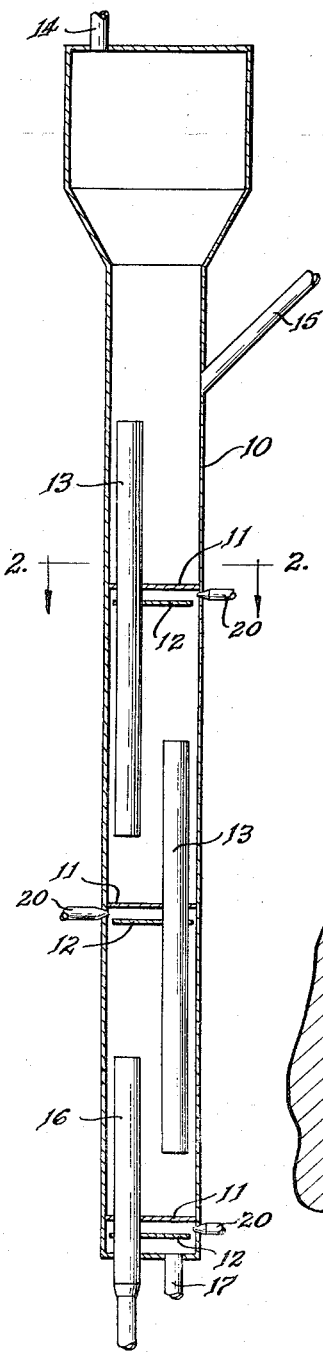
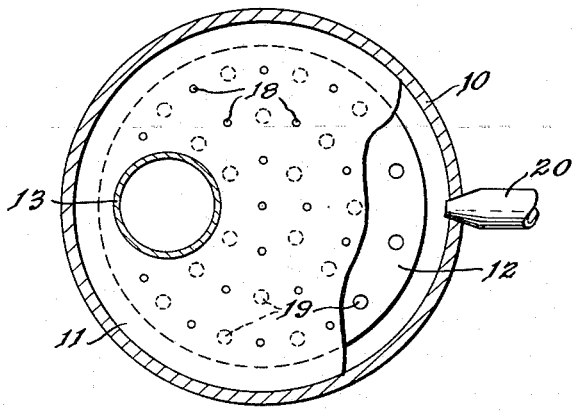
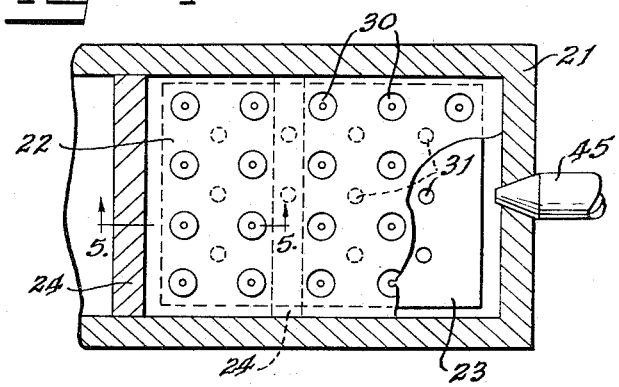
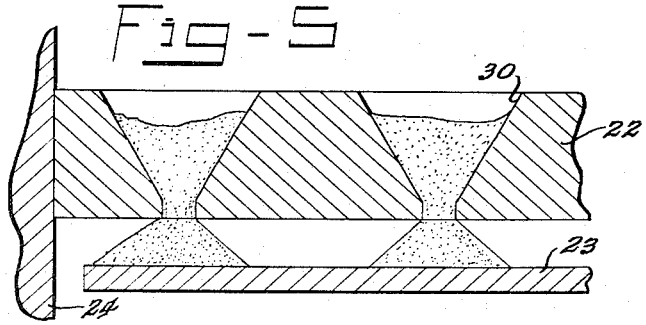
INVENTORS
Albert A. Jonke
Johan E. A. Graae
Norman M. Levitz
By: Roland A. Anderson
Attorney

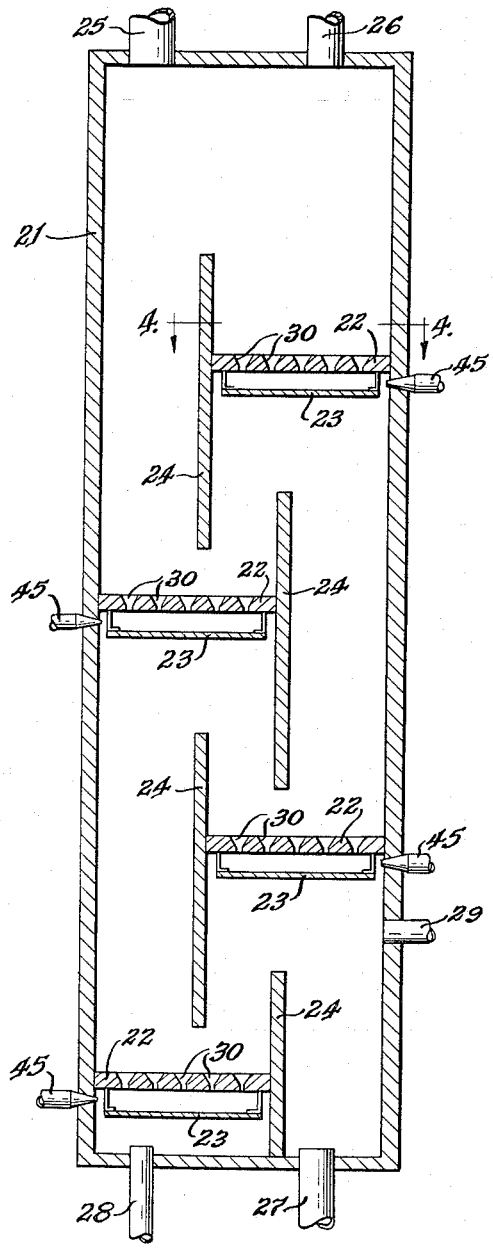
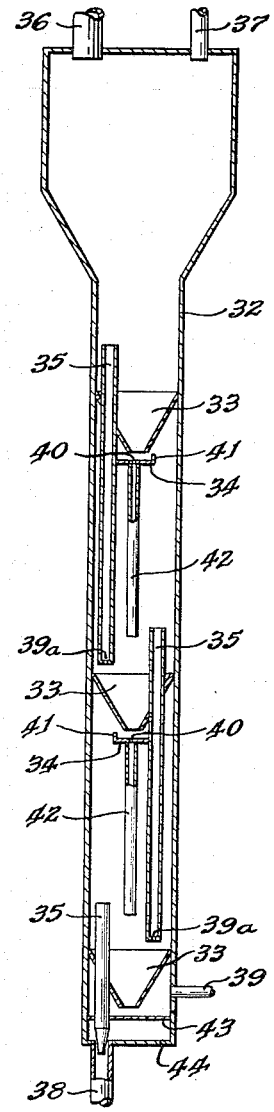

United States Patent Office 2,911,290
Patented Nov. 3, 1959

2,911,290

MULTISTAGE FLUIDIZED BED REACTOR

Albert A. Jonke and Johan E. A. Graae, Elmhurst, and Norman M. Levitz, Bellwood, Ill., assignors to the United States of America as represented by the United States Atomic Energy Commission Application April 18, 1957, Serial No. 653,722

2 Claims. (Cl. 23—284)

This invention relates to a reactor of the type in which a chemical reaction takes place between a granular solid that flows in one direction through the reactor and a gas that flows in the opposite direction through the solid so as to fluidize the same. More specifically, the reactor is one of the multistage type.

It is known to convert $UO_3$ to $UO_2$ by the use of $H_2$ and to convert $UO_2$ to $UF_4$ by use of HF, and both of these reactions can be carried out in the reactor of the present invention.

When reactions of this type are carried out through the counter current flow of a granular solid and a fluidizing gas, some difficulties are encountered with the use of several stages in the reactor. It has been found that the granular solid will flow down from one stage to the other even when the flow of fluidizing gas stops. This is obviously undesirable, because it means that the solid goes through the reactor without the desired chemical reaction.

In accordance with the present invention, the various stages of the reactors are provided with baffles that permit the upward flow of fluidizing gas through a granular solid and yet prevent or limit the downward flow of the solid when the flow of the gas is shut off.

In the drawings:

Fig. 1 is a vertical sectional view of a first form of reactor of the present invention;

Fig. 2 is a horizontal sectional view taken on the line 2—2 of Fig. 1 and showing the relationship of perforations in a plate to perforations in a baffle therebelow;

Fig. 3 is a vertical sectional view of a second form of reactor of the present invention;

Fig. 4 is a horizontal sectional view taken on the line 4—4 of Fig. 3 and showing the relationship of perforations in a plate to perforations in a baffle;

Fig. 5 is a vertical sectional view taken on the line 5—5 of Fig. 4; and

Fig. 6 is a vertical sectional view of a third form of reactor of the present invention.

The reactor of Fig. 1 comprises a vertical column 10, a plurality of plates 11 constituting stages, a plurality of baffles 12, and a plurality of downcomer pipes 13. The column 10 is circular and cylindrical and has a vent 14 for gas at the top, a feed inlet 15 near the top, a product outlet 16 at the bottom, and a gas inlet 17 at the bottom.

There are three plates or stages 11, and, as shown in Fig. 2, each plate has a plurality of perforations 18. One of the baffles 12 is supported by and just below each plate 11 in spaced relation thereto and has a plurality of perforation 19 which are offset from the perforations 18 in the associated plate 11 and are larger in diameter than these perforations 18. The plates 11 fit the interior of the column 10. The baffles 12 are smaller in diameter than the plate 11 so as to be spaced from the interior of the column 10, with the result that the space between each baffle 12 and its associated plate 11 can be completely cleared of solid material when necessary. There are two downcomer pipes 13 extending through and supported by the upper and intermediate sets of plate 11 and baffle 12, one pipe 13 being at one side of the column 10, and the other at the other side of the column. The product outlet 16 extends through the lower set of plate 11 and baffle 12 much in the manner of the downcomer pipes 13.

A granular solid such as $UO_3$ or $UO_2$ enters the column 10 through the feed inlet 15, and fluidizing gas such as $H_2$ or HF enters the column 10 through the gas inlet 17. $UO_3$ in granular form may be produced by the process disclosed in Lawroski et al. application, Serial No. 658,901, filed May 13, 1957. The upward flow of gas through a given baffle 12 and associated plate 11 prevents the downward flow of solid therethrough and compels the level solid to rise until overflow takes place in the associated downcomer pipe 13, which brings the solid to the plate 11 below. The movement of the gas through the solid fluidizes it and causes it to behave somewhat like a boiling liquid. The movement of the gas through the solid facilitates the chemical reaction between the solid and the gas. For the conversion of $UO_3$ to $UO_2$, a temperature of 575° C. and a slightly superatmospheric pressure may be used, and $N_2$ is added to the $H_2$ if needed to provide sufficient fluidization. For the conversion of $UO_2$ to $UF_4$, a temperature of 450° C. and a slightly superatmospheric pressure may be used, $N_2$ is added to the HF if needed to provide sufficient fluidization and $H_2$ is added to prevent any oxidation of the uranium and to complete reduction of $UO_3$ to $UO_2$. The reactor of Fig. 1 may be formed of stainless steel.

The unaligned perforations 18 and 19 in the plates 11 and baffles 12 permit the upward flow of the fluidizing gas therethrough, but will not permit the solid material to flow through the baffles 12 when the introduction of fluidizing gas to the reactor is stopped. Small cones of solid material are formed below each perforation 18 in the plates 11 in the manner shown in Fig. 5 for the reactor of Fig. 4, these cones preventing the further flow of solid material when the flow of gas is stopped. When the flow of gas is resumed, it will pass through the perforations 19 in each baffle 12, clearing out the accumulations of solid material directly below the perforations 18 in the associated plate 11. To prevent accidental blocking of the narrow spaces between the plates 11 and baffles 12, special gas nozzles 20 are provided to blow these spaces clean, either at the discretion of the operator or at controlled intervals. The fluidized solid material does not flow through the plates 11 and baffles 12, but instead, flows from a given stage to the stage below through the appropriate downcomer pipe 13 when the level of fluidized material at the given stage becomes high enough for the material to overflow into the downcomer pipe.

This reactor was operated successfully without difficulties in two 13-hour runs in the conversion of $UO_2$ to $UF_4$.

The reactor of Fig. 3 comprises a vertical column 21, a plurality of plates 22 constituting stages, a plurality of baffles 23, and a plurality of weirs 24 which with certain wall portions of the column 21 constitute downcomer pipes. The column 21 is cylindrical and oblong in horizontal section, i.e., the shorter horizontal dimension being perpendicular to the plane of the paper in Fig. 3. The column 21 has a vent 25 for gas at the top, a feed inlet 26 at the top, a product outlet 27 at the bottom, a gas inlet 28 at the bottom below the bottom plate 22 and baffle 23, and a gas inlet 29 near the bottom of the column below the next-to-the-bottom plate 22 and baffle 23.

There are four plates or stages 22, and, as shown in Fig. 4, each plate is oblong and has a plurality of perforations 30, which, as shown in Fig. 5, have upper conical portions and lower cylindrical portions. Perforations 30 with their conical upper portions produce an improved gas distribution and a better contact between gas and solids. Each plate 22 extends between the front and back walls of the column 21 and from a side wall thereof part of the way to the opposite side wall so as to terminate in a free end at which the associated weir 24 is secured. Each weir 24 extends between the front and back walls of the column 21 so that a downcomer pipe or means is formed by the weir 24, the front and back walls of the column, and the side wall of the column opposite that from which the associated plate 22 extends. The plates 22 extend alternately from opposite sides of the column 21.

One of the baffles 23 is supported by and just below each plate 22 in spaced relation thereto and has a plurality of perforations 31, which, as shown in Fig. 4, are offset from the perforations 30 in the plates 22 and are smaller in diameter than the upper portions of the perforations 30 and larger in diameter than the lower portions thereof. Each baffle 23 is smaller in outline than the associated plate 22 so as to be spaced from the associated weir 24, the front and back walls of the column 21, and the side wall thereof from which the associated plate 22 extends, with the result that space between each baffle 23 and its associated plate 22 can be completely cleared of solid material when necessary.

The parts of the reactor of Fig. 3 may be formed of stainless steel.

The operation of the reactor of Fig. 3 is much like that of the reactor of Fig. 1. Fluidizing gas enters the column 21 through the two inlets 28 and 29, so that the flow of gas is uniform across the entire width of the column. The two inlets 28 and 29 are desirable, because each plate 22 extends only part way across the column 21. Previous mention has been made with reference to the reactor of Fig. 1, of the fact that, as shown in Fig. 5, small cones of solid material are formed below perforations 30 in the plates 22 when the flow of gas is stopped, these cones preventing the further flow of solid material.

The reactor of Fig. 6 comprises a vertical column 32, a plurality of open-ended inverted cones 33 constituting stages, a plurality of baffles 34, and a plurality of downcomer pipes 35. The column 32 is circular and cylindrical and has a vent 36 for gas at the top, a feed inlet 37 at the top, a product outlet 38 at the bottom, and a gas inlet 39 at the bottom.

There are three cones 33 each having a single perforation formed by its open small lower end. The downcomer pipes 35 have restrictions 39a in their lower ends and are secured to the cones 33 so as to be supported thereby and extend through the cones in offset parallel relation to the axes thereof. Restrictions 39a prevent the fluidizing gas from causing blow back of the solid in the downcomers, so that a more even flow of solid material from stage to stage results. The bottom downcomer pipe 35 extends into the product outlet 38. The downcomer pipes 35 are alternately adjacent opposite sides of the column 32. One of the two baffles 34 is secured to each of the upper two downcomer pipes 35 so as to be located just below the associated cone in spaced relation thereto. Each of the baffles 34 has a weep hole 40 which is aligned with axes of the associated cone 33 and is smaller than the open lower end of the cone.

Around each baffle 34 a weir 41 extends from and back to the associated downcomer pipe 35. Each baffle 34 carries a fill pipe 42 which extends therefrom downward to a point somewhat below the top of the downcomer pipe 35 below. Below the bottom cone 33 is a floor 43 which serves as a baffle and is imperforate except at the region through which the bottom downcomer pipe 35 extends. The floor 43 is spaced from a bottom 44 of the column 32 from which the product outlet 38 extends.

The operation of the reactor of Fig. 6 is like that of the reactor of Fig. 1. The granular solid and the fluidizing gas enter through the inlet 37 and inlet 39, respectively, and the gas and product resulting from the chemical reaction exit through the vent 36 and outlet 38, respectively. In the event of loss of a bed or other operational difficulty, the flow of fluidizing gas can be stopped, permitting the granular solid to flow downward in the fill pipes 42, filling all beds the desired levels. The beds are filled to the desired levels, since the lower ends of the fill pipe 42 are below the top of the downcomer pipes 35 below. When the flow of fluidizing gas stops, the flow of granular solid from the bottom cone 33 onto the floor 43 below is limited to the formation of a cone of granular material below the small end of the cone 33, as shown in Fig. 5 for the reactor of Fig. 4.

To prevent accidental blocking of the narrow spaces between the plates 22 and the baffles 23, special gas nozzles 45 are provided to blow these spaces clean, either at the discretion of the operator or at controlled intervals.

In the various reactors disclosed herein, a greater number of stages than shown may be used if desired.

The intention is to limit the invention only within the scope of the appended claims.

What is claimed is:

1. A multistage fluidized-bed reactor comprising a vertical cylindrical column, a plurality of stages disposed across the column, each stage comprising an open-ended inverted cone forming a perforation in the stage, a plurality of baffles located just below the stages, each baffle having a small hole located just below the apex of the cone of the associated stage, a plurality of low weirs, one extending around each baffle, a plurality of elongated tubes, one extending down from the hole in each baffle, downcomer pipes extending through the cones in offset relation to the axes thereof, means for introducing fluidizing gas in the bottom of the column, a vent for the fluidizing gas at the top of the column, a feed inlet near the top of the column, and a product outlet near the bottom of the column.

2. The reactor specified in claim 1, the downcomer pipes being located alternately adjacent one side of the column and the other side.

References Cited in the file of this patent

UNITED STATES PATENTS

| | | |
|---|---|---|
| 2,480,639 | Ferguson | Aug. 30, 1949 |
| 2,531,068 | Maust | Nov. 21, 1950 |
| 2,698,321 | Findlay | Dec. 28, 1954 |
| 2,715,565 | McKay | Aug. 16, 1955 |
| 2,750,258 | Jukkola | June 12, 1956 |
| 2,876,079 | Upchurch | Mar. 3, 1959 |